United States Patent
Bulgajewski et al.

(10) Patent No.: US 7,500,536 B2
(45) Date of Patent: Mar. 10, 2009

(54) SEAT HEATER WITH OCCUPANT SENSOR

(75) Inventors: Edward F. Bulgajewski, Genoa, IL (US); Michael M. Cubon, Park Ridge, IL (US)

(73) Assignee: Illinois Tool Works Inc., Glenview, IL (US)

( * ) Notice: Subject to any disclaimer, the term of this patent is extended or adjusted under 35 U.S.C. 154(b) by 79 days.

(21) Appl. No.: 11/528,116

(22) Filed: Sep. 27, 2006

(65) Prior Publication Data

US 2008/0073130 A1 Mar. 27, 2008

(51) Int. Cl.
*B60R 21/015* (2006.01)
*B60L 1/02* (2006.01)
*H05B 1/02* (2006.01)
*A47C 7/72* (2006.01)

(52) U.S. Cl. .................. 180/273; 219/217; 219/202; 219/528; 177/136; 177/144; 280/735; 200/85 A; 297/217.3; 297/180.12

(58) Field of Classification Search ................ 219/217, 219/528, 202; 177/136, 144; 180/273; 280/735; 200/85 A; 297/217.3, 180.12; 340/667
See application file for complete search history.

(56) References Cited

U.S. PATENT DOCUMENTS

| | | | | | |
|---|---|---|---|---|---|
| 4,628,187 | A | * | 12/1986 | Sekiguchi et al. | 219/505 |
| 4,761,541 | A | * | 8/1988 | Batliwalla et al. | 219/528 |
| 4,801,785 | A | * | 1/1989 | Chan et al. | 219/549 |
| 4,882,466 | A | * | 11/1989 | Friel | 219/219 |
| 5,181,006 | A | * | 1/1993 | Shafe et al. | 338/22 R |
| 5,206,482 | A | * | 4/1993 | Smuckler | 219/219 |
| 5,401,922 | A | | 3/1995 | Asta | |
| 6,084,217 | A | * | 7/2000 | Bulgajewski | 219/505 |
| 6,093,910 | A | * | 7/2000 | McClintock et al. | 219/217 |
| 6,124,577 | A | * | 9/2000 | Fristedt | 219/497 |
| 6,150,642 | A | * | 11/2000 | Weiss et al. | 219/528 |
| 6,229,123 | B1 | * | 5/2001 | Kochman et al. | 219/549 |
| 6,307,188 | B1 | * | 10/2001 | Bulgajewski | 219/505 |
| 6,371,552 | B1 | * | 4/2002 | Narita et al. | 297/180.12 |
| 6,455,823 | B1 | * | 9/2002 | Bulgajewski et al. | 219/548 |
| 6,495,809 | B2 | * | 12/2002 | Bulgajewski et al. | 219/548 |

(Continued)

FOREIGN PATENT DOCUMENTS

DE 19724168 8/1998

(Continued)

*Primary Examiner*—Randy W Gibson
(74) *Attorney, Agent, or Firm*—Mark W. Croll; Paul F. Donovan

(57) ABSTRACT

The present invention relates to a combination heater and occupant sensor device that may be used in an automobile seat. The device will heat a seat and sense the mass of an occupant in the seat. The device provides the ability to combine occupant sensors with a seat heater without damaging the sensors or obtaining incorrect sensor readings. The sensor results may be processed and used to control air bag deployment, for example, or to indicate if the seat belt of an occupied seat is not being employed. To provide flexibility of the device during use, the device may be formed on a polymer substrate and configured to include apertures throughout. In addition, in the heating portion of the device, conductive material may be blended in a polymer and the device may be configured to limit conductor cracking after repeated flexing of the device thus extending the life of the device.

12 Claims, 5 Drawing Sheets

U.S. PATENT DOCUMENTS

| | | | |
|---|---|---|---|
| 6,609,752 B2 * | 8/2003 | Inoue ........................ | 297/217.3 |
| 6,884,965 B2 * | 4/2005 | Nelson et al. ................ | 219/217 |
| 6,906,293 B2 * | 6/2005 | Schmiz et al. ............... | 219/494 |
| 6,953,224 B2 * | 10/2005 | Seto et al. .................. | 297/217.3 |
| 7,119,705 B2 * | 10/2006 | Manlove et al. ............. | 340/667 |
| 7,134,715 B1 | 11/2006 | Fristedt et al. | |
| 7,205,505 B2 * | 4/2007 | Diemer et al. ............... | 219/217 |
| 7,285,748 B2 * | 10/2007 | Nelson et al. ................ | 219/217 |
| 7,306,283 B2 * | 12/2007 | Howick et al. ......... | 297/180.12 |
| 2003/0141983 A1 | 7/2003 | Schmiz et al. | |
| 2003/0173195 A1 * | 9/2003 | Federspiel ................. | 200/85 A |
| 2003/0214161 A1 | 11/2003 | Seto et al. | |
| 2004/0021346 A1 | 2/2004 | Morinet et al. | |
| 2005/0103773 A1 * | 5/2005 | Diemer et al. ............... | 219/528 |
| 2007/0215601 A1 * | 9/2007 | Frank .......................... | 219/497 |
| 2007/0290532 A1 * | 12/2007 | Frank .................... | 297/180.12 |
| 2008/0315639 A1 * | 12/2008 | Wenmackers et al. .... | 297/217.3 |

FOREIGN PATENT DOCUMENTS

| | | |
|---|---|---|
| EP | 1356983 | 10/2003 |
| FR | 2841841 | 1/2004 |
| WO | WO 0189267 | 11/2001 |
| WO | WO 0192900 | 12/2001 |
| WO | WO 0206083 | 1/2002 |
| WO | WO 03088715 | 10/2003 |
| WO | WO 2005061268 | 7/2005 |
| WO | WO 2005061282 | 7/2005 |

* cited by examiner

SEAT HEATER WITH OCCUPANT SENSOR

FIELD OF THE INVENTION

The present invention relates generally to seat heaters for automobiles and more particularly to seat heaters that incorporate an occupant sensor.

BACKGROUND OF THE INVENTION

Various heating devices are known and are used in the automotive industry. Examples of such heating devices include seat heaters that are used in many vehicles to improve the comfort of passengers riding in the vehicle. Some of these known seat heaters include a flexible heating device that is used to maintain the flexural characteristics of the seat. Examples of such heaters can be found in U.S. Pat. Nos. 6,884,965 and 7,053,344, both commonly owned by the applicant and incorporated herein by reference. These heaters have proven satisfactory and provide additional benefits including increased heating capacity, uniformity of heating, and protection against contact with liquid spills, among other benefits.

Recently, occupant sensors have been incorporated into automobile seats. These occupant sensors have been used to provide a reminder signal that if a seat is occupied but the associated seatbelt is not being employed, the occupant is alerted to fasten the seatbelt. Occupant sensors have also been used with vehicle air bags. In these applications, depending on the data collected by the occupant sensor, the air bag may be activated so that it is ready for deployment if needed. More specifically, as the occupant sensor detects the weight of the passenger sitting on the seat, a processor calculates the weight or other parameters and sends a signal to a controller to perform a certain action, such as activation of the air bag for deployment. In another embodiment, depending on the weight of the occupant, the signal to the controller may be to reduce the amount of force in which the air bag will release. In North America, for example, federal regulations require occupant sensor to have the ability to detect size and weight of an occupant.

Presently, automotive seat heaters and occupant sensors exist as separate components within a seat and utilize different technologies. For example, seat heaters typically include fabric based, wire wound elements, or carbon fiber elements. Occupant sensors on the other hand are often plastic sheet based, screen printed, polymer thick film (PTF). Each of the two technologies works well alone but when combined each can cause difficulties to the operation of the other's systems. For example, the heater wires and carbon fiber can interfere with the sensing capabilities of the occupant sensors, causing false or incorrect readings due to heat and varying pressure points. As a result, many known vehicle seats having an occupant sensor do not include the seat heater option, or the seat heater is installed below the occupant sensor which severely limits the seat heater's performance. Consequently, there exists a need in the automotive industry for a combination seat heater and occupant sensor device. The present invention addresses these and other known drawbacks with existing seat heater and occupant sensor devices.

SUMMARY OF THE INVENTION

The present invention relates to a combination heater and occupant sensor device that may be used in an automobile seat. With the invention, the high temperatures generated by the heater will not affect the operation of the occupant sensor. In addition, false readings experienced with existing occupant sensors are reduced, if not eliminated. Advantages of incorporating both a heater and sensor into a single device include decreased costs and assembly time, as well as the elimination of unsafe static buildup, wear, and friction between two rubbing parts.

Other features and advantages of the invention will become apparent to those skilled in the art upon review of the following detailed description, claims and drawings in which like numerals are used to designate like features.

DETAILED DESCRIPTION OF THE EMBODIMENTS

Figures 1A, 1B:
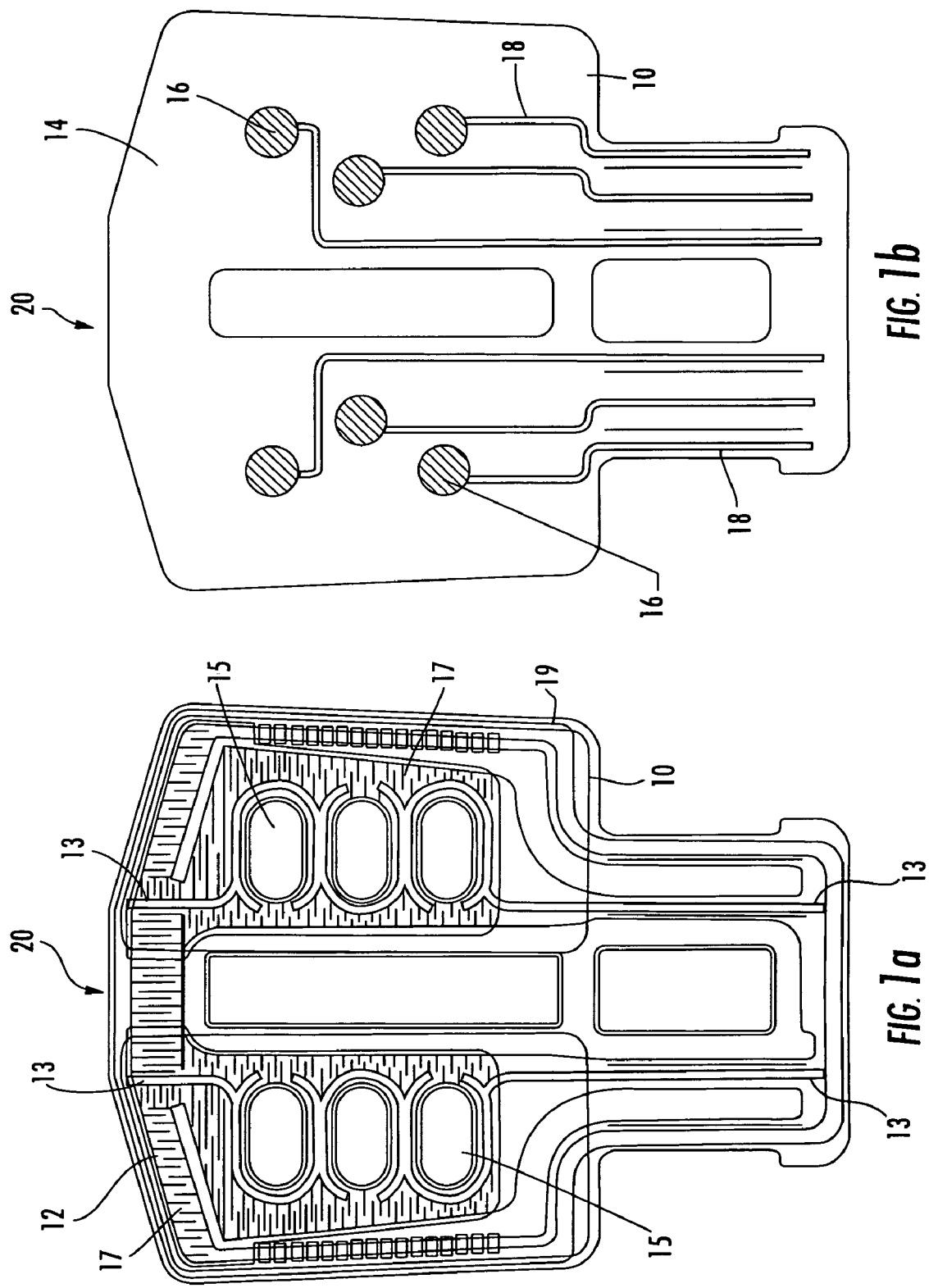
FIG. 1a is a top plan view of the heater/occupant sensor device of an embodiment of the present invention, illustrating the heater portion.
FIG. 1b is a bottom plan view of the heater/occupant sensor device of FIG. 1a, illustrating the occupant sensor portion.

The present invention may be embodied in many forms, some of which are illustrated by the Figures. Referring to FIGS. 1a and 1b, in one aspect of the invention, a combination heater and occupant sensor device 20 is illustrated showing both sides of the device 20. The device 20 may include a polymer sheet substrate 10, for example a polyester sheet such as Mylar®, on which a heater portion 12 (FIG. 1a) may be screen printed on one side, and an occupant sensor portion 14 (FIG. 1b) may be screen-printed on the opposite side of the substrate 10. The substrate 10 may be made of an electrically insulative material in the form of a thin film, for example having a thickness generally within the range of 0.004 to 0.010 inches though other film thicknesses are possible.

Figure 2:
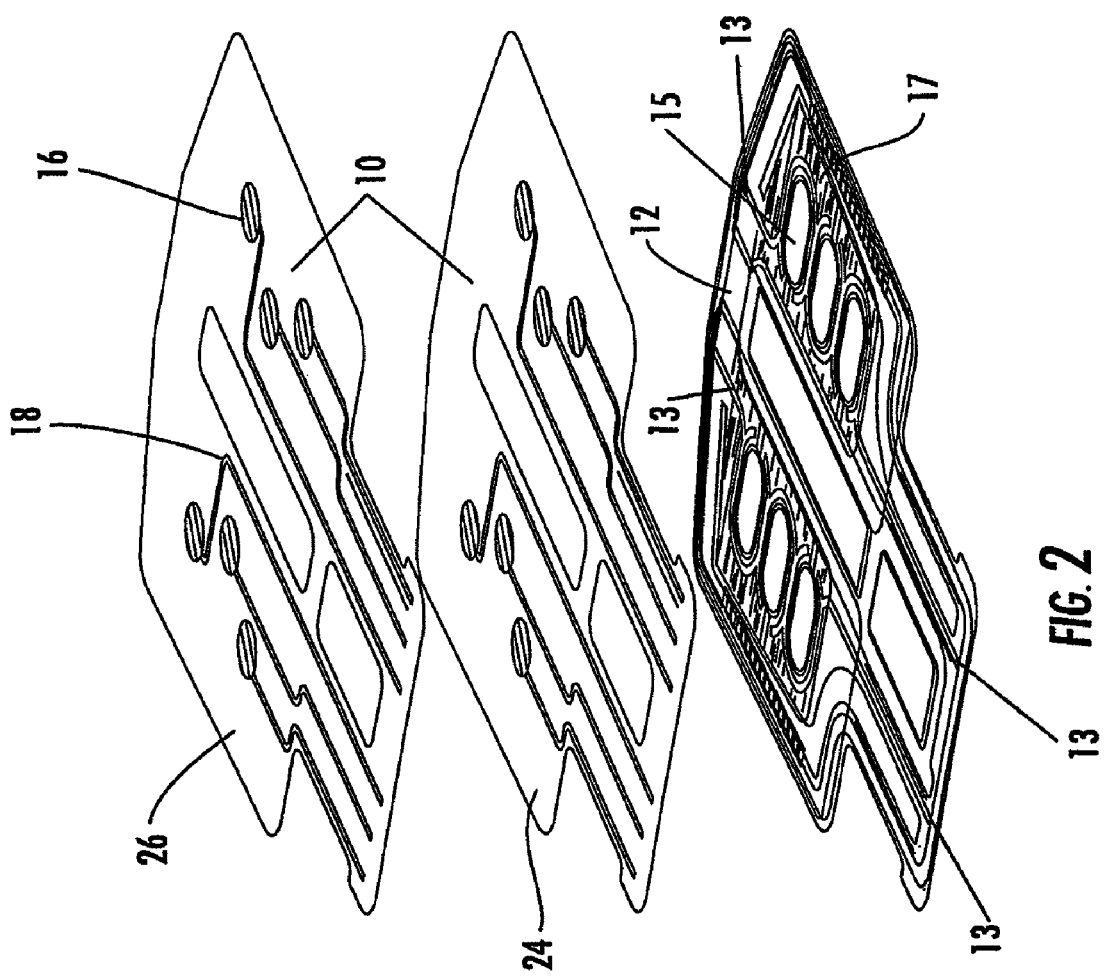
FIG. 2 is an exploded view of the heater/sensor device of FIG. 1a, illustrating the layers of the heater/occupant sensor device.
Figure 3:
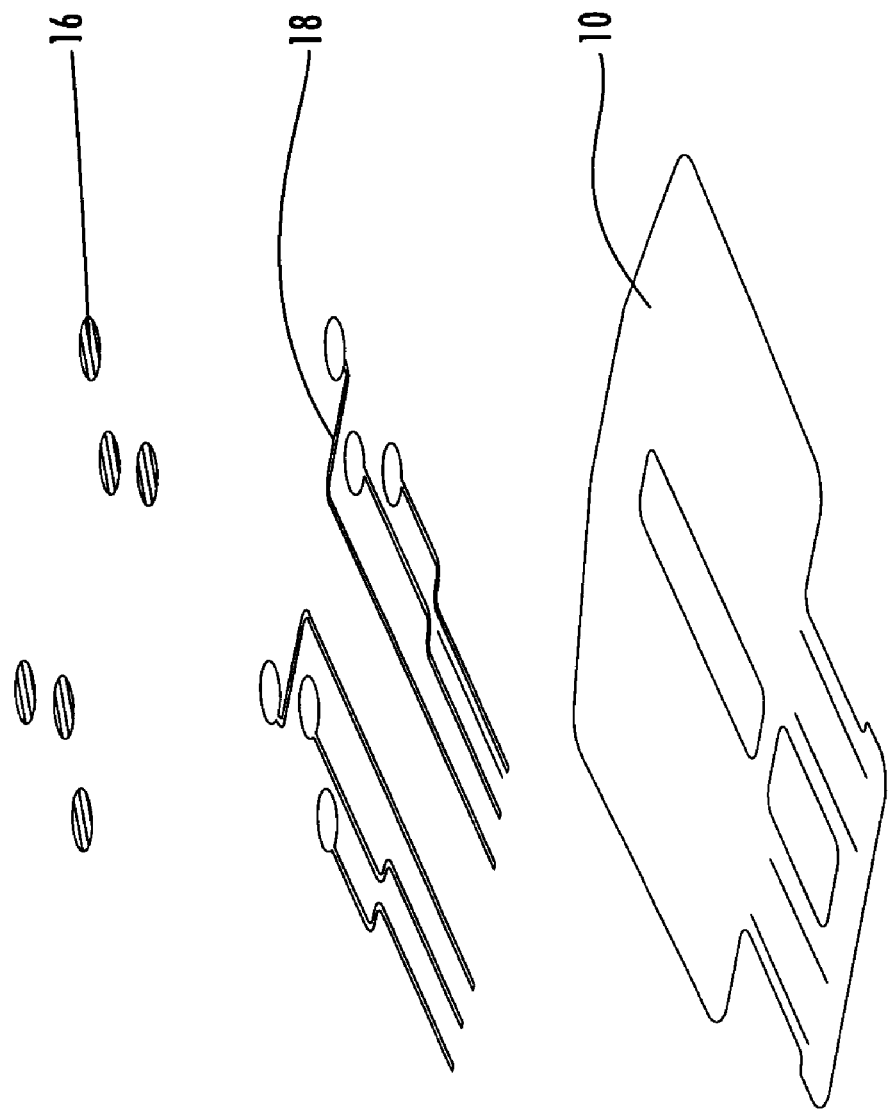
FIG. 3 is an exploded view of the occupant sensor portion of an embodiment of the present invention.

Alternatively, the heater portion 12 and occupant sensor portion 14 may both be screen-printed on the same side of the substrate 10. In aspects of the invention providing the heater and sensor on the same side of the substrate 10, the heater portion 12 is adapted to accommodate the occupant sensors 16 of the sensor portion 14 by including a conductive layer forming at least one buss 13. As shown in FIGS. 1a and 2, two busses 13 may be used and may extend from one end of the substrate 10 to the opposing end. It should be understood that still other numbers and configurations of busses are possible and may be used with various aspects of the invention. In an exemplary embodiment, the busses 13 are configured to form a plurality of substantially isolated nonconductive areas 15 on the substrate surface 10 in which the sensors 16 will be located. Positioning the sensors 16 within the isolated nonconductive areas on the same side of the substrate as the heater may protect the sensors 16 from heat generated during operation of the heater portion 12. In embodiments in which the sensor portion 14 and heater portion 12 are on opposite sides of the substrate 10, the sensors 16 may be protected from interference from the heater by the substrate 10, and thus the sensors 16 may be located in any positions on the sensor portion 14 suitable for the particular application. Similarly, the busses 13 may be configured in any appropriate design on the heater portion 12, for example without providing any isolated nonconductive areas.

To provide even heating across the heater portion 12, numerous traces 17 may extend outwardly from the busses 13 to distribute the heat across the heater portion. In an alternative aspect of the invention, at least some of the traces 17 may include spurs (similar to spurs 103 depicted in FIG. 4) extending toward the next adjacent trace. Additionally, at least some of these spurs may include branches extending in a variety of directions to more fully cover the substrate 10 and distribute heat, except over the isolated areas 15.

Referring back to FIG. 1b, the occupant sensor portion 14 may include a plurality of sensors 16, such as membrane switches provided as dielectric honeycombs or other suitable configurations that are spaced across the sensor portion 14. The sensors 16 may be in electrical communication with conductive traces 18, which extend from each sensor to an electrical lead that will in turn deliver the sensor signal to a processor. The conductive traces 18 may be made of polymer silver or other suitable materials.

Referring to FIG. 2, which illustrates an exploded view of the device 20, the occupant sensor portion 14 may include two sensor layers 24 and 26 that may be attached through the use of a dielectric adhesive. The plurality of sensors 16 may be positioned on one substrate 10 and a second electrically insulative substrate 10 may be positioned over these sensors 16. In one aspect of the invention, when the device 20 is assembled and the heater portion 12 is applied to the substrate 10, the sensors 16 are positioned such they are located over the isolated nonconductive areas 15.

One skilled in the art will understand that known heaters may include electrical conductors that are typically made from a conductive metal such as copper, silver, gold, aluminum, carbon, or graphitic materials. It is further known that the conductive material used as the electrical conductor may be made of very small flakes of material in a polymer matrix. If this material is caused to be over-stretched or subject to repeated stretching, the conductive layer may crack, thereby resulting in undesirable arcing.

Figure 4:
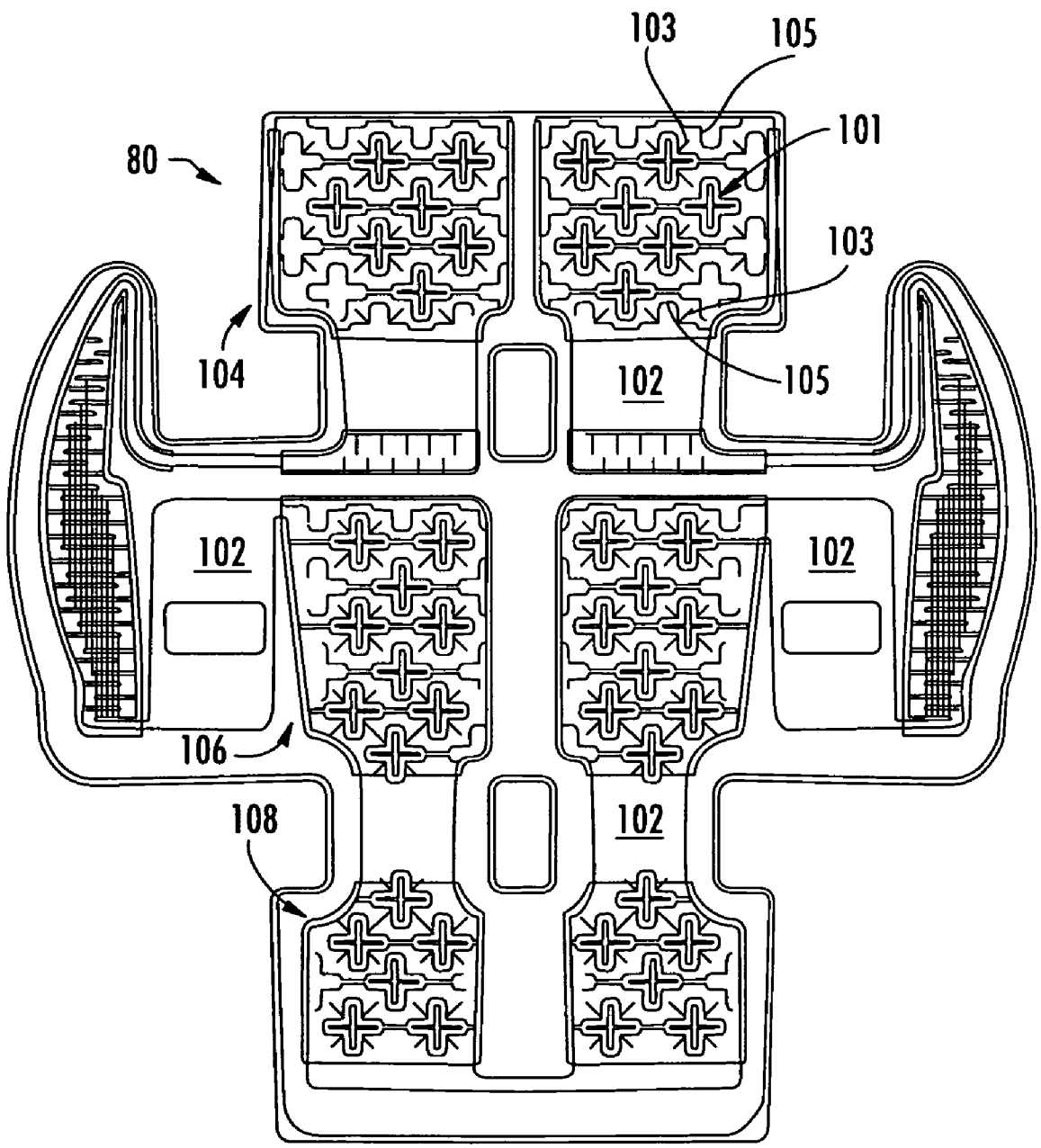
FIG. 4 is a schematic of an alternative embodiment of a seat heater portion in accordance with the present invention.

To overcome these known problems, in an alternative aspect of the invention illustrated in FIG. 4, a heater portion 80 may be configured to limit elongation of the conductive layer when the device is subjected to a flexing action. This is accomplished by the incorporation of apertures 101 in the substrate. Providing apertures 101 in the form of intersecting elongated slots substantially normal to each other, such as in a cross-shaped pattern shown in FIG. 4, will permit the desired flexing of the heater portion 80 without the undesirable cracking of the conductive layer used on the heater. As illustrated in FIG. 4, a possible configuration of apertures includes cross-shaped apertures 101 arranged in aligned rows and ranks offset with respect to each other, so that apertures 101 in adjacent rows and ranks overlap. In an alternative, the apertures 101 may be configured with rounded ends as shown, providing stress relief and reducing any potential tearing from the bending and flexing of the heater portion during use.

Returning back to FIG. 1a, a resistive layer 19 may be disposed on the conductive layer forming at least one buss 13 such that when an electrical power source is connected to the buss structure of the device 20, heat is generated. The resistive layer 19 may include a positive temperature coefficient (PTC) material to provide an increasing resistance in response to an increasing temperature, known as a self-regulating heater, or it may include a fixed resistance element which requires an electronic controller to regulate the heat level. The resistive layer 19 may be comprised of a polymer thick film.

In an alternative aspect of the invention, a dielectric film may be applied between the substrate 10 and the conductive layer forming the at least one buss 13 to improve chemical resistance and durability of the device 20. For example, the dielectric film may be a polyester film with a polyester adhesive. Additionally, other types of films, such as nylon polyolefin and polyimide, may be used as well as other types of adhesives such as epoxy and acrylics. The dielectric film, which effectively functions as a laminate, protects the surface of the heating portion 12 by preventing the conductive materials, for example silver and carbon black, from being removed by contact and abrasion during use. The laminate can further help reduce or eliminate cracking of the conductive layer forming at least one buss 13, thereby extending the life of the heating portion 12.

Referring again to FIG. 4, the heater 80 may be configured to be employed with vehicle seats having tie-down channels commonly used in automotive seat construction. Various open areas 102 may be provided adjacent to heating zones 104, 106, and 108. This will permit the heater 80 to be folded at these areas and into tie-down channels of the seat construction. Depending on the application, the size, number and shape of individual heating zones 104, 106 and 108 may vary to provide proper heating for the seat. As illustrated in FIG. 4, the heating zones may include conductive traces 105 that further define spurs 103 that extend toward adjacent conductive traces. As shown, the traces and spurs extend in numerous directions to substantially cover the individual heating zones to provide uniform heating over these areas.

Figure 5A:
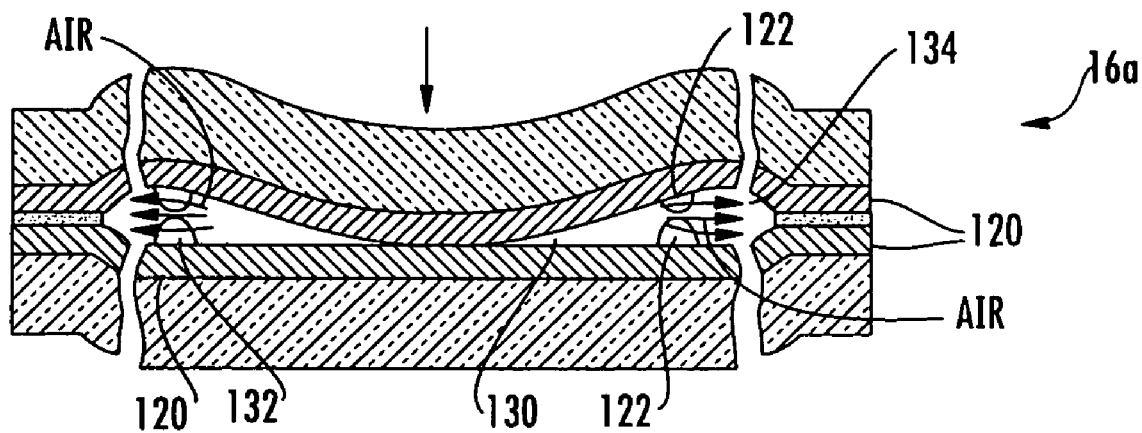
FIG. 5a is a cross-sectional view of a membrane switch of an occupant sensor portion of an embodiment of the invention, illustrating actuation of the switch.
Figure 5B:
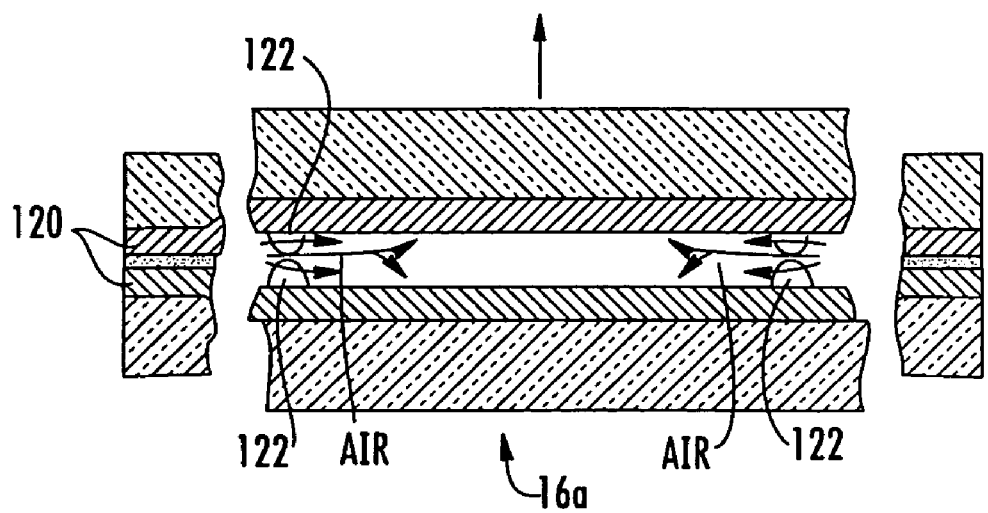
FIG. 5b is a cross-sectional view of a membrane switch of an occupant sensor portion of an embodiment of the invention, illustrating release of the switch.

The occupant sensor 16 may comprise any suitable sensing device, such as a device capable of sensing mass. In one embodiment of the invention, the sensor 16 may be a membrane switch. Referring to FIGS. 5a and 5b, cross-section views of an exemplary membrane switch are depicted. A membrane switch 16a may have first and second substantially flexible electrical contacts 120 facing each other that when come into contact with each other (FIG. 5a) will send an electrical signal to a processor indicating this contact. The membrane switch 16a may also have a layer of dielectric material 122 deposited between, and on the surface of, one of the first and second contacts 120. The layer of dielectric material 122 may be deposited in a predetermined geometric pattern including a plurality of cells 130 defined by cell walls 132. The cell walls are broken in predetermined positions about the perimeter of each cell so that, during and after actuation of the switch, air within any cell can vent to one or more adjoining cells. This venting enables activation and prevents a vacuum from forming between the first and second contacts thereby enabling the switch to break contact after being depressed.

The dielectric spacer 122 is deposited with a uniform thickness on top of the conductive layer 120 such as by deposition, silk screening or any similar process where the thickness can vary. In one embodiment, the predetermined pattern of the dielectric spacer layer 122 is in the form of a series of hexagons forming a plurality of substantially identical cells 130 across the surface of the conductive layer 120. Each cell 130 is defined by six cell walls 132 which are shared with adjacent cells in the pattern. It has been found that the hexagonal pattern provides the most conductive surface areas with the least amount of dead space at the wall junctions. While not as preferred, other patterns and shapes such as in the form of rectangles, circles or similar patterns may be used. Each cell wall 132 is broken proximate its midpoint to provide channels 134 between adjacent cells 130. Such channels 134 enable air between the first and second assemblies 12 and 14 to move between one or more adjacent cells 130 when depressed to activate the switch 16. Additionally, when the switch 16 is released, the channels 134 enable air to re-enter the depressed cell or cells 130.

In an embodiment having a dielectric spacer layer 122 on the surface of each conductive layer 120, the channels 134 of each cell 130 preferably align with the channels 134 on the opposite side of the cells 130 so that three continuous sets of parallel lines or air channels are formed across the membrane switch 16. These lines or air channels assist in the free flow of air between one or more cells 130, which in turn provides better actuation and release of the switch. In order to vary the force required to activate the switch 16, the size of the hexagons may be adjusted.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A device to produce heat and to sense mass for use in a vehicle seat comprising:
   an electrically insulative substrate defining a first side and a second opposite side,
   a heater portion printed on the first side of the substrate, the heater portion including a layer of conductive material forming at least one buss extending across the first side of the substrate, the heater portion further including a plurality of traces connected to the at least one buss, and
   a sensor portion disposed on the second opposite side of the substrate, the sensor portion including at least one membrane sensor configured to sense mass.

2. The device of claim 1 further comprising a resistive layer disposed over the layer of conductive material of the heater portion, whereby the resistive layer has an increasing resistance in response to an increasing temperature.

3. The device of claim 1 wherein the layer of conductive material comprises a conductive polymer and a material chosen from the group consisting of copper, gold, silver, aluminum, carbon, or graphitic materials.

4. The device of claim 1 wherein the traces comprise conductive material flakes mixed with a conductive polymer.

5. The device of claim 1 wherein the substrate includes a plurality of apertures that are configured to limit elongation of the layer of conductive material.

6. The device of claim 5 wherein the apertures include intersecting elongated slots.

7. The device of claim 6 wherein the apertures are aligned in rows and ranks offset with respect to each other.

8. The device of claim 1 wherein at least some of the traces include spurs extending outwardly from the traces.

9. The device of claim 1 further comprising a chemical resistive laminate disposed across the sensor portion.

10. A device to produce heat and to sense mass for use in a vehicle seat comprising:
    an electrically insulative substrate made of a polymeric film;
    a conductive layer screen printed onto a first side of the substrate,
    a resistive layer configured across the conductive layer, the conductive layer and resistive layer being adapted to generate heat when subjected to an electrical power source; and
    a membrane sensor configured to sense mass, the membrane sensor disposed on a second and opposite side of the substrate, the sensor comprising a first substantially flexible electrical contact, a second substantially flexible electrical contact, and a layer of dielectric material disposed between the first and second electrical contacts.

11. The device of claim 10 further including a plurality of membrane sensors disposed on the second side of the substrate.

12. The device of claim 11, wherein the resistive layer comprises a positive temperature coefficient material.

\* \* \* \* \*